United States Patent [19]
Worrall

[11] Patent Number: 4,874,026
[45] Date of Patent: Oct. 17, 1989

[54] VEHICLE WINDOW SCREEN ASSEMBLY

[76] Inventor: Dayer Worrall, 1345 E. Lester, South Weber, Utah 84403

[21] Appl. No.: 177,061

[22] Filed: Apr. 4, 1988

[51] Int. Cl.⁴ .............................................. E06B 9/08
[52] U.S. Cl. .................................. 160/23.1; 160/122; 160/272; 160/273.1; 160/310; 160/370.2
[58] Field of Search ...................... 160/23.1, 120, 122, 160/270, 271, 272, 273, 310, 370.2; 296/97 C, 97 D, 97 G, 98

[56] References Cited

U.S. PATENT DOCUMENTS

| | | | |
|---|---|---|---|
| 2,023,666 | 12/1935 | Courtright | 160/310 X |
| 2,594,813 | 4/1952 | Seibert | 296/97.6 |
| 2,927,819 | 3/1960 | Johnson | 160/370.2 |
| 3,042,111 | 7/1962 | Wytovich | 160/370.2 X |
| 3,658,378 | 4/1972 | Sutren | 296/219 |
| 3,672,425 | 6/1972 | Schulze-Robbecke et al. | 160/331 |
| 3,980,122 | 9/1976 | Takazawa | 160/120 X |
| 4,171,845 | 10/1979 | Hirsch | 160/310 X |
| 4,398,585 | 8/1983 | Marlow | 160/271 X |
| 4,419,982 | 12/1983 | Eckels | 160/120 X |
| 4,442,881 | 4/1984 | Monteath et al. | 296/97 D X |
| 4,596,093 | 6/1986 | Esposito | 160/310 X |
| 4,606,157 | 8/1986 | Esposito | 160/310 X |
| 4,624,084 | 11/1986 | Esposito | 160/310 X |
| 4,694,877 | 9/1987 | Dunbar | 160/273.1 |
| 4,736,980 | 4/1988 | Eubanks | 160/370.2 X |
| 4,744,403 | 5/1988 | Hausmann et al. | 160/310 X |
| 4,775,180 | 10/1988 | Phillips | 160/370.2 X |

Primary Examiner—Ramon S. Britts
Assistant Examiner—David G. Kolman
Attorney, Agent, or Firm—Thorpe, North & Western

[57] ABSTRACT

A vehicle window screen assembly selectively and alternately operable to cover or uncover a vehicle window. The assembly includes a first flexible screen for blocking at least a portion of light impinging thereon, and a spring-loaded, generally cylindrical roller about which the screen is wrapped with a free end exposed, the roller being mountable at its ends on a side of the window to be covered so that when the free end of the screen is pulled toward the opposite side of the window, the roller rotates to unwind the screen and when the free end is released, the roller retracts and rolls up the screen. A screen positioning device is attached to the free end of the screen and is controllable to selectively pull the screen toward the opposite side of the window to substantially cover it, or to release the screen to allow it to be retracted and rolled up on the roller. First and second guides are attached to the window adjacent the top and bottom edges of the screen so that when the screen is unrolled, the guides will hold the top and bottom edges in close proximity to the window.

16 Claims, 1 Drawing Sheet

## VEHICLE WINDOW SCREEN ASSEMBLY

BACKGROUND OF THE INVENTION

This invention relates to a screen for vehicle windows adapted for both blocking entry of the sun into the interior of the vehicle and for providing insulative benefits.

It has long been considered desirable to limit the entry of sunlight into the interior of a vehicle, such as automobile, truck, bus and the like, so as to prevent excessive warming of the interior and to prevent damage to the interior surfaces (drying, cracking, fading and the like). In accordance with this desire, a variety of arrangements have been proposed for blocking the sun including the use of tinted windows and windshields, the provision of window shades, especially in vans which can be closed or opened, and the provision of metallic or plastic screens which may be inserted into a vehicle window frame and semipermanently attached. Of course, the primary method of blocking the sun from entering a vehicle windshield has been the use of only partially tinted windows, with the tinting being placed in the upper 1/5 or so of the windshield, or the use of accordian like fold-out inserts which may be put in place on the vehicle dashboard against the inside of the windshield while the vehicle is not being driven. Such arrangements do cut down on the amount of sunlight allowed to enter the interior of a vehicle and thus do inhibit the interior warming. However, the tinting of the windshield provides only limited protection from the sun since substantial warming still takes place and damage to interior surfaces will likely still occur from sunlight entering the windshield at locations below the level of tinting. The foldout screens function to better prevent entry of the sun but they are quite cumbersome to use and must be stored when the vehicle is being driven. Also, such foldout screens do not provide any substantial deterent to convective transfer of heat from the interior surface of the windshield to other interior parts of the vehicle.

SUMMARY OF THE INVENTION

It is an object of the invention to provide a vehicle window screen which is simple in construction, easy to use, and effective for blocking the entry of sun through a vehicle window.

It is another object of the invention to provide such a vehicle window screen which cooperates with the window to insulate the interior of the vehicle from the exterior.

It is a further object of the invention to provide such a vehicle window screen which does not require special storage when the vehicle is being driven and which may be immediately put in place to cover a window when the driver leaves the vehicle.

The above and other objects of the invention are realized in a specific illustrative embodiment of a vehicle window screen assembly which includes a flexible sheet of material which substantially blocks the passage of light therethrough, a generally cylindrical, spring-loaded roller mountable at its ends on one side of a vehicle window, with the sheet of material wrapped about the roller to leave an exposed free end which, when pulled toward the opposite side of the window, causes the unwrapping of the material from the roller and, when released, is again rolled up on the roller, and a mechanism attached to the free end of the material for pulling the material toward the opposite side of the window to a position where the material substantially covers the window. Also included are guides attached to the top and bottom portions of the window or window frame so that as the sheet of material is unrolled from the roller, the guides hold the top and bottom edges of the material in close proximity to the window.

In accordance with one aspect of the invention, the mechanism for pulling the free end of the sheet of material includes cords attached to the free end, at the top and bottom corners of the material, and a pair of electric motors with pulleys, about which the cords are wrapped. The electric motors may be operated in one direction to thereby rotate their pulleys and wrap the cords thereabout to pull the sheet of material to cover the window. Likewise, the motors may be operated in the other direction to release the sheet of material to allow it to roll up again on the roller.

BRIEF DESCRIPTION OF THE DRAWINGS

The above and other objects, features and advantages of the invention will become apparent from a consideration of the following detailed description presented in connection with the accompanying drawing in which.

DETAILED DESCRIPTION

Figure 1:
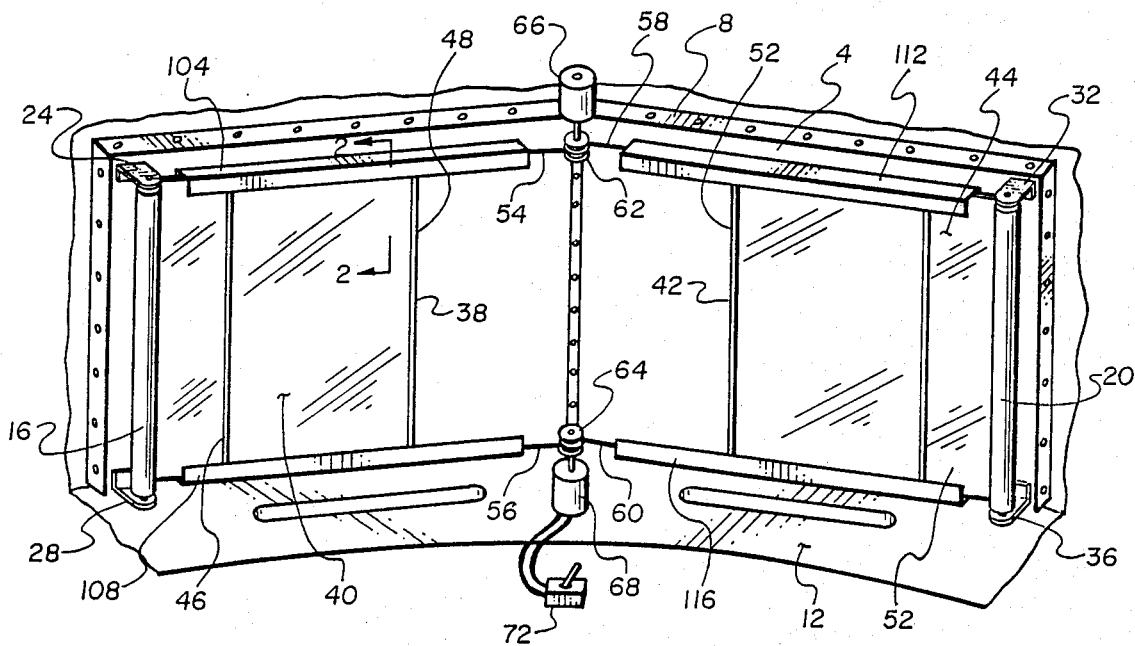
FIG. 1 shows a fragmented, perspective view of a vehicle window screen assembly made in accordance with the principles of the present invention.

Referring to FIG. 1, there is shown a vehicle window screen assembly mounted on the inside of a vehicle windshield 4 contained inside a frame 8 above a conventional vehicle dashboard 12. The assembly includes a pair of cylindrical rollers 16 and 20 mounted to extend generally vertically on respective outer sides of the window 4. The rollers 16 and 20 are mounted to rotate in brackets 24 and 28, and 32 and 36 respectively, with the brackets being adhesively attached to the inside surface of the windshield 4. Alternatively, the brackets could be attached to the windshield frame 8 or other part of the interior of the vehicle. The rollers 16 and 20 are spring-loaded in the manner of conventional pull down, roller window blinds.

Wrapped about each of the rollers 16 and 20 are flexible screens 40 and 44 respectively. The screens 40 and 44 are wrapped about respective rollers so that free ends 48 and 52 of the screens are both directed towards the center of the windshield 4, from the side of the respective roller closest to the windshield. The screens 40 and 44 advantageously are made of a substantially opaque mylar material or other suitable sun-blocking and sun and heat reflecting, flexible cloth, plastic, or similar material. The screens are generally rectangular as shown and are dimensioned to substantially cover respective halves of the windshield when unrolled from their primary rollers. Lightweight, stiffening rods 38 and 42 attached to free ends 48 and 52 respectively of the screens 40 and 44 to provide rigidity to the screens. Additional rods, such as rod 46, could be attached to the screens to extend generally vertically as shown to further stiffen the screens.

Strings or cords 54 and 56, and 58 and 60 connect the free ends 48 and 52 of the screens 40 and 44 respectively to pulleys 62 and 64 mounted on the drive shafts of reversible electric motors 66 and 68. The motors 66 and 68 are mounted in a conventional way above and below the windshield 4 respectively to face one another so that the drive shafts of the motors are generally co-linear. The cords are connected at one end to the free ends 48 and 52 of the screens, at the bottom and top edges thereof, and at the other end to respective pulleys 62 and 64. The cords are wrapped about the pulleys in the same direction, for example, counterclockwise so that when the pulleys are rotated in the counterclockwise direction (looking down on the assembly from the top), both the cords are taken up or wound up on the pulleys, in which event the cords would pull the respective screens toward the center of the windshield. When the pulleys 62 and 64 are rotated in the clockwise direction, then the cords 54 and 58 would be released to allow the respective screens to retract and be rewound on their respective primary rollers 16 or 20.

Figure 3:
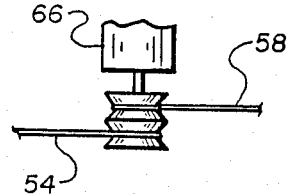
FIG. 3 is a side, elevational, fragmented view of a motor pulley of the assembly of FIG. 1.

FIG. 3 shows a side, elevational view of pulley 62, with cord 54 being wrapped about a lower track of the pulley, and cord 58 being wrapped about an upper track. The reason for this is to avoid having cords 54 and 58 become tangled on the pulley which might otherwise occur if, for example, both cords were wrapped about the same track of the pulley.

The pulleys 62 and 64 are caused to rotate in either the counterclockwise direction (looking down on the assembly), by placing a three-position toggle switch 72 in one position, or the clockwise direction by placing the toggle switch in a second position. Placing the toggle switch in a third position stops the motors 66 and 68 from turning in either direction. The toggle switch is coupled between the motors 6 and 68 and, for example, the vehicle battery to control the supply of electrical current to the motors.

Figure 4:
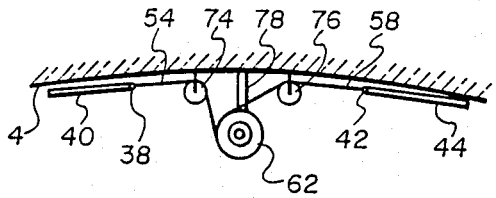
FIG. 4 is a graphic top plan view of another embodiment of a motor pull arrangement for attaching to the window screen cords.

FIG. 4 shows an alternative arrangement for connecting the cords of the screens 40 and 44 to the pulleys of the motors 66 and 68, with the pulley 62 of motor 66 being specifically shown for illustrative purposes. In this arrangement, cords 54 and 58 first extend about pulleys 74 and 76 respectively, which are mounted close to the windshield 4, and then to the pulley 62 which, with the motor 66, could be mounted by a bracket 78 at a position spaced away from the windshield. With the pulleys 74 and 76 in this position, the screens 40 and 44 may be maintained close to the windshield 4, as shown. A similar arrangement would be provided for the lower motor pulley 64.

Figure 2A:
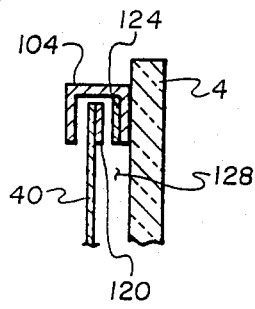
FIGS. 2A and 2B respectively show a cross-section, fragmented view of the window screen assembly of FIG. 1 taken along lines 2—2, and a cross-sectional, fragmented view of an alternative embodiment of the edge of a screen.

To further hold the screens 40 and 44 in close proximity to the windshield 4, four tracks or guides 104, 108, 112 and 116 (FIG. 1) are provided to contain and allow the sliding or movement therewithin of the top and bottom edges of the screens. As best seen in FIG. 2A, showing the guide 104 in exaggerated cross-sectional view taken along lines 2—2 of FIG. 1, each guide has a generally U-shaped cross section and is attached by a suitable adhesive by a side wall to the windshield 4. The channels in the topmost guides face downwardly while those in the bottommost guides face upwardly. The upper edge of the screen 40 extends into the channel of the guide 104, again as best seen in FIG. 2A. Attached to the upper inside edge of the screen 40 is an elongate piece of metal foil 120, and mounted to extend substantially along the length of the guide on the inside wall closest to the windshield 4 is a magnetic strip of material 124. As the screen 40 is unwound from the roller 16 and moved toward the pulleys 62 and 64, the magnetic strip of material 124 attracts the metal foil 120 so that the foil slides over the magnetic strip but also holds the foil and thus the screen 40 against the inside wall of the guide 104. The bottom edge of the screen 40 is likewise held against the inside wall of the guide 108 to form a pocket 128 of air between the screen 40 and windshield 4 and this serves to insulate the interior of the vehicle from the exterior.

Figure 2B:
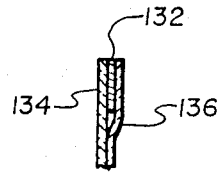

An alternative arrangement for placement of the metal foil on the edges of the screens is shown in FIG. 2B. There, the metal foil 132 is shown sandwiched between two layers of screen 134 and 136. Of course, the metal foil is very thin and flexible so that it may readily be rolled up on and unrolled from the corresponding roller 16 or 20.

Figure 5:
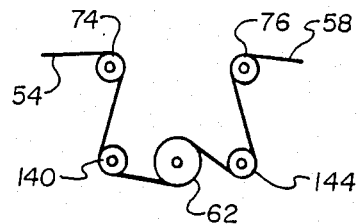
FIG. 5 is a graphic, top plan view of yet another embodiment of pulley arrangement for attaching to the window screen cords.

FIG. 5 graphically shows still another arrangement for connecting the cords of the screens 40 and 44 to the motor pulleys 62 and 64. Here two additional pulleys 140 and 144 guide cords 54 and 58 respectively to pulley 62. A similar arrangement would be provided for the lower motor pulley 64.

Figure 6:
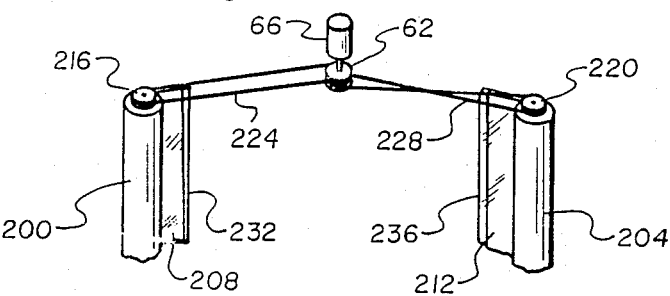
FIG. 6 is a perspective, fragmented view of an alternative embodiment of a window screen assembly made in accordance with the present invention.

FIG. 6 shows a perspective, fragmented view of an alternative embodiment of a window screen assembly made in accordance with the present invention in which spring-loaded rollers may be replaced with conventional cylindrical rollers 200 and 204. Screens, such as described for FIG. 1, 208 and 212 all are rolled up respectively on rollers 200 and 204. Pulleys 216 and 220 are rigidly mounted to the tops of the rollers 200 and 204 respectively so that when the pulleys are rotated, the respective rollers are likewise rotated. Continuous loop cords 224 and 228 are wound respectively around pulleys 216 and 220 and around respective tracks of pulley 62 of motor 66. Free ends 232 and 236 of the screens 208 and 212 are attached to those segments of the cords 224 and 228 which are closest to the windshield, as shown. However, in order for cord 228 to pull the screen 212 toward the center of the windshield as cord 224 is pulling screen 208 toward the center, cord 228 is crossed as shown. Then, when motor pulley 62 rotates in the clockwise direction (looking down on the assembly) both screens will be pulled toward the center of the windshield. The lower ends of the rollers 200 and 204 and screens 208 and 212 would similarly be coupled to cords connected to the lower motor pulley 64 and motor 68.

Because the cords 224 and 228 are continuous loop cords, when the motor 66 is reversed to rotate the pulley 62 in the counterclockwise direction, roller 200 is caused to rotate in the counterclockwise direction to retract and wrap the screen 208 thereabout. Roller 204 is caused to rotate in the clockwise direction to retract and wrap thereabout screen 212. Thus, the rollers 200 and 204 need not be spring loaded since the motor 66 can drive the rollers to rotate in either the "unwind" or "wind-up" direction to thereby release or retract the respective screens.

In the manner described, an easy to construct and simple to use vehicle window screen is provided. In addition to blocking sunlight from entering a vehicle window, such as a windshield, the screen also provides insulation by creating a pocket of air between the screen and the window in question. The window screen assembly is always in place in the vehicle and so there is no need for storing the screen when not in use.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A retractable window screen assembly for covering a vehicle window and the like comprising
   a first flexible screen for blocking at least a portion of light impinging thereon, said screen having a top edge, a bottom edge and a free end,
   a first spring-loaded, generally cylindrical roller about which the screen is wrapped, with the free end exposed, said roller being mountable at its ends in a position oriented generally vertically adjacent to a side of the vehicle window so that when the free end of the screen is pulled horizontally toward the opposite side of the window, the roller rotates to unwind the screen, and when the free end is released, the roller retracts and rolls up the screen,
   screen positioning means attached to the free end of the screen and controllable to selectively pull the screen horizontally toward the opposite side of the window to substantially cover the window, or release the screen to allow it to be retracted and rolled up on the roller,
   first guide means attached to the window adjacent the top edge and bottom edge of the screen when it is unrolled from the roller for holding the top and bottom edges of the screen in close proximity to the window to produce an air pocket between the screen and the window, and
   a pair of elongate, flexible metallic strips, one of which is attached to extend along the top edge of the screen and the other of which is attached to extend along the bottom edge of the screen, and wherein said guide means comprises a pair of strip magnets attached to the window, each in general alignment with the respective metallic strip when the screen is unrolled from the roller to attract and hold the metallic strips for sliding engagement and movement along the said strip magnets as said screen is unrolled from and rolled back onto said roller.

2. A window screen assembly as in claim 1 wherein said metallic strips are attached to the side of the screen facing the window.

3. A window screen assembly as in claim 1 wherein said screen comprises two or more layers of material, and wherein said metallic strips are disposed between two of the layers of material.

4. A window screen assembly as in claim 1 wherein said guide means further includes a pair of elongate tracks, each having a U-shaped cross-section to define a channel therein, said tracks being attached to the window, one of which is positioned with its channel facing downwardly to receive the top edge of the screen along its length thereof and the other of which is positioned with its channel facing upwardly to receive the bottom edge of the screen along its length thereof, wherein each strip magnet is mounted in a respective one of the channels of the tracks against the side closest to the window.

5. A window screen assembly as in claim 1 wherein said screen is comprised of a heat and ultraviolet light reflective material.

6. A window screen assembly as in claim 1 wherein said screen is comprised of mylar film.

7. A window screen assembly as in claim 1 wherein said screen is comprised substantially of an opaque material.

8. A window screen assembly as in claim 1 further including one or more lightweight rods attached to the screen to extend from the top edge to the bottom edge to stiffen the screen.

9. A window screen assembly as in claim 1 wherein said screen positioning means includes cords attached to the free end of the screen near the top and bottom edges thereof.

10. A window screen assembly as in claim 9 wherein said screen positioning means further includes
    a pair of take-up pulleys mountable on the opposite side of the window near the top and bottom thereof, and about which respective cords are wound to roll up on the pulleys as they are rotated in one direction to thereby pull the screen across the window to cover it, and to unwind from the pulleys and allow retraction of the screen onto the roller as the pulleys are rotated in the opposite direction, and
    drive means for selectively causing the pulleys to rotate in either one direction or the other.

11. A window screen assembly as in claim 10 wherein said drive means comprises a pair of electric motors each having a respective take-up pulley mounted thereon to rotate as the motor is operated.

12. A window screen assembly as in claim 10 wherein said vehicle window is positioned side-by-side a second vehicle window, and wherein said window screen assembly further includes
    a second flexible screen for blocking at least a portion of light impinging thereon, said second screen having a top edge, a bottom edge and a free end,
    a second spring-loaded, generally cylindrical roller about which the second screen is wrapped with the free end exposed, said second roller being mountable at its ends in a position oriented generally vertically adjacent to the side of the second window farthest from the first-mentioned window.
    means attaching the free end of the second screen to said take-up pulleys so that as the pulleys are rotated to pull the first screen to cover the first window, the second screen is also pulled to cover the second window, and
    second guide means attached to the second window for guiding the second screen as it is unrolled from said second roller and to hold the top and bottom edges of the second screen in close proximity to the second window to produce an air pocket between the second screen and the second window.

13. A retractable window screen assembly for covering a first and second vehicle window positioned side-by-side comprising first and second flexible screens for blocking at least a portion of light impinging thereon, said screens having top edges, bottom edges and free ends, first and second spring-loaded, generally cylindrical rollers about which the first and second screens are wrapped respectively, with the free ends of the screens exposed, said first and second rollers being mountable at their ends in positions oriented generally vertically adjacent to the outside sides of the first and second window respectively so that when the free end of each screen is pulled horizontally toward the opposite side of the respective window, the rollers rotate to unwind respective screens, and when the free ends are released, the rollers retract and roll up the respective screens, first and second pairs of take-up pulleys mountable on respective opposite sides of the first and second windows, the pulleys of each pair being mounted near the top and bottom of the respective windows, first and second sets of cords attached to the free ends of the first and second screens respectively near the top and bottom edges thereof and windable about the first and second pair of pulleys respectively to roll up on the pulleys as they are rotated in one direction to thereby pull the screens across respective windows to cover the windows, and to unwind from respective pulleys and allow retraction of respective screens onto the rollers as the pulleys are rotated in the opposite direction, drive means for selectively causing the pulleys to rotate in either one direction or the other, first and second guide means attached to the first and second window respectively adjacent the top edge and bottom edge of the first and second screen respectively when the screens are unrolled from the rollers, for holding the top and bottom edges of the screens in close proximity to the windows to produce an air pocket between the screens and the windows, and wherein said take-up pulleys are spaced transversely away from the center line between the first and second windows, said assembly further comprising additional pulley means mounted adjacent said center line for redirecting toward the take-up pulleys the cords attached to the first and second screens.

14. A retractable window screen assembly for covering a vehicle window and the like comprising a flexible, generally opaque sheet of material having a top edge, a bottom edge and a free end, a generally cylindrical roller about which the sheet of material is wrapped with the free end exposed, said roller being mountable at its ends on a side of the vehicle window so that when the free end of the material is pulled toward the opposite side of the window, the roller rotates to unwind the material, first and second pulleys mounted on the ends of the roller so that when the pulleys are rotated, the roller is caused to rotate in the same direction as the pulleys, third and fourth pulleys mountable at the side of the window opposite that side at which the roller is mountable, near the top and bottom thereof, and first and second continuous cord loops, the first being looped about the first and third pulleys adjacent the top of the window, and the second being looped about the second and fourth pulleys adjacent the bottom of the window, wherein the free end of the material at the top and bottom thereof is joined to the first and second cord loops so that as the loops are moved in one direction, the sheet of material is unwound from the roller and pulled toward the third and fourth pulleys to cover the window, and as the loops are moved in the opposite direction, the roller is rotated to rewind the sheet of material thereon and retracted from covering the window.

15. The assembly of claim 14 further including drive means for causing the third and fourth pulleys to rotate and thereby move the first and second cord loops selectively in either direction.

16. The assembly of claim 15 wherein said drive means comprises first and second reversible electric motors on which the third and fourth pulleys respectively are mounted to rotate as the motors are operated.

* * * * *